Patented Jan. 14, 1936

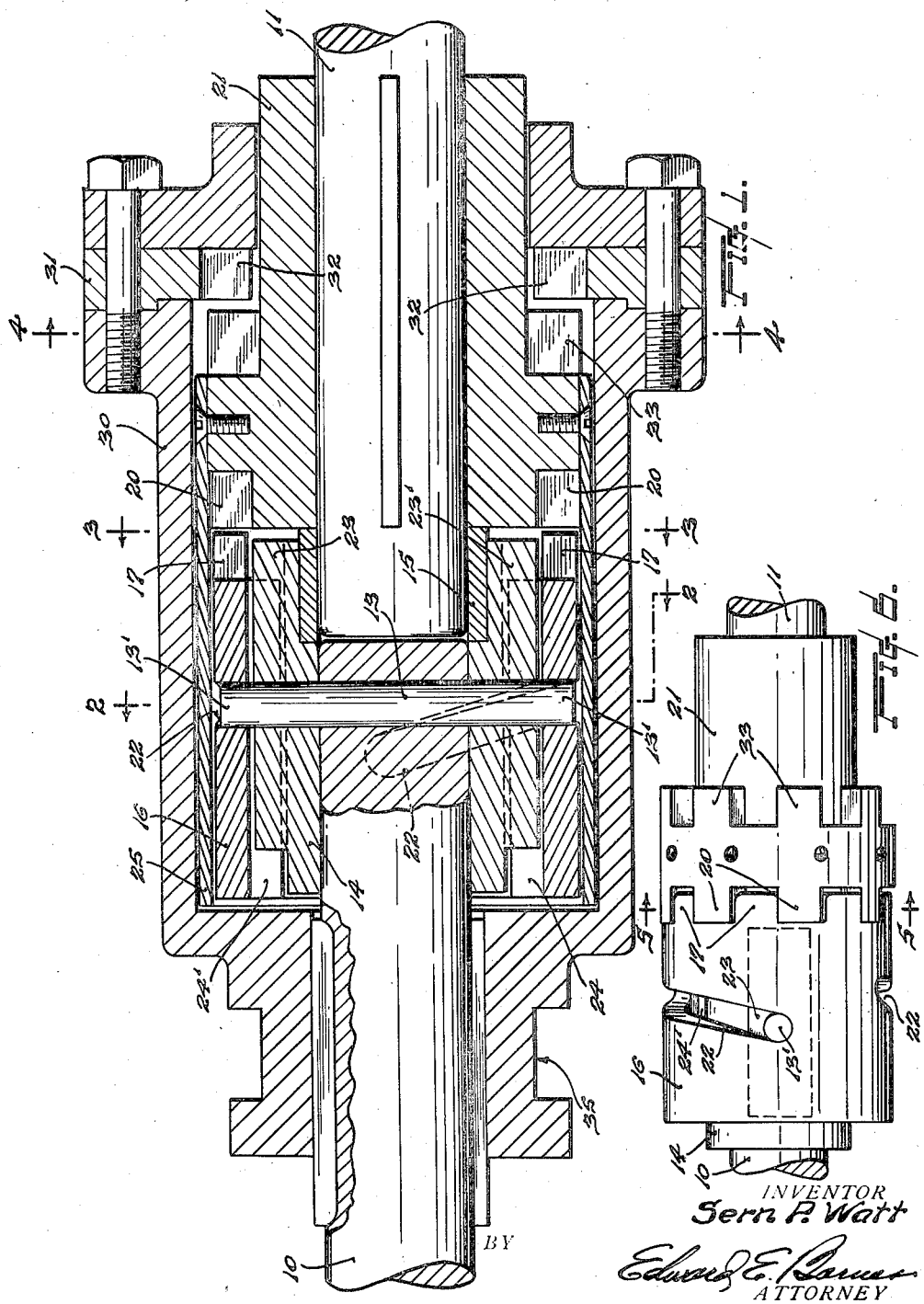

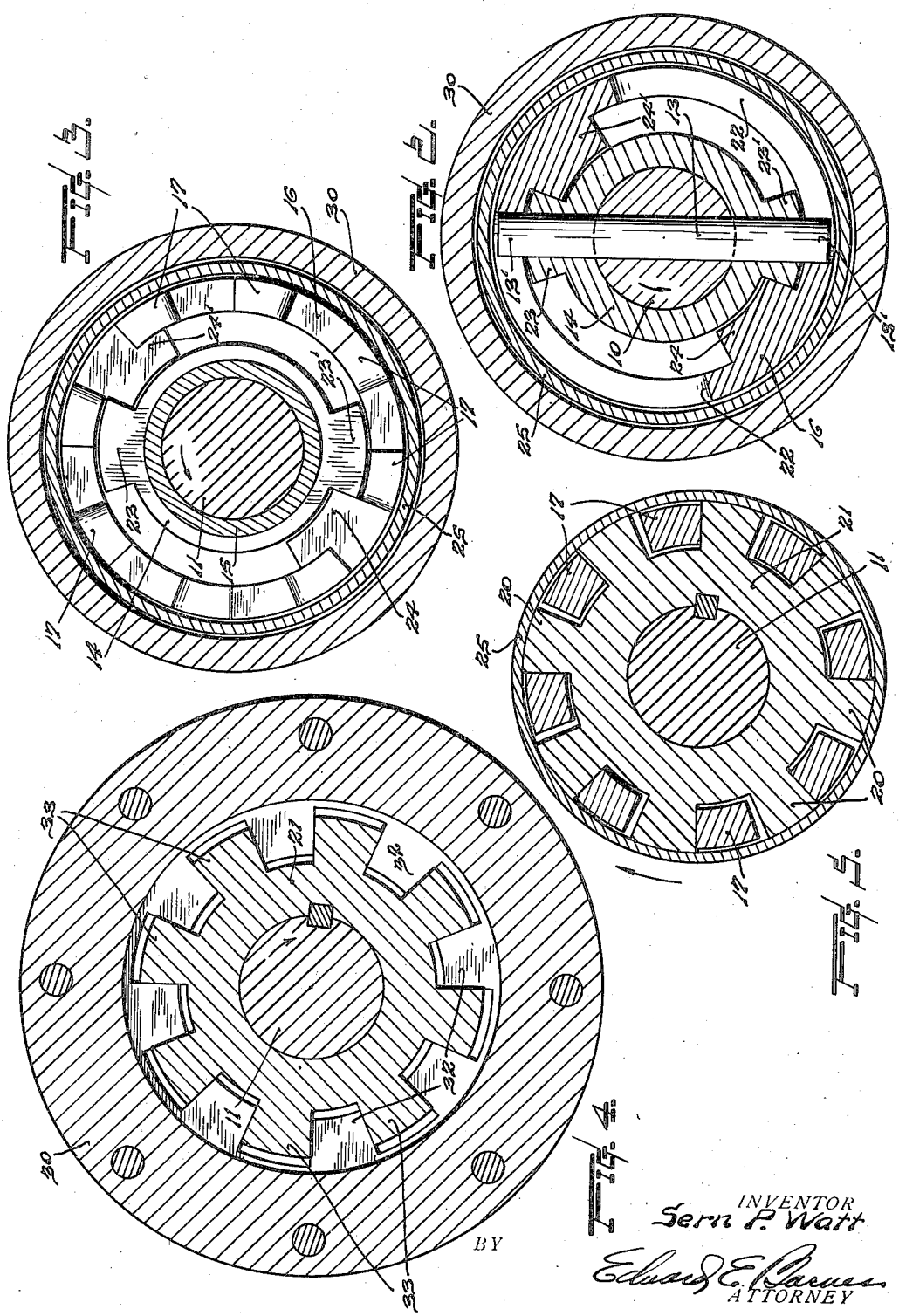

2,027,798

UNITED STATES PATENT OFFICE 2,027,798

TORQUE TRANSMITTING MECHANISM

Sern P. Watt, Seattle, Wash., assignor to James Graham Watt, Seattle, Wash.

Application March 7, 1931, Serial No. 520,847

11 Claims. (Cl. 192—48)

This invention relates to torque transmitting mechanism adapted to couple a driving member with a driven member in a manner such that the driven member is automatically released responsive to an over-running of the same with respect to the drive member and automatically coupled with the drive member responsive to acceleration of the latter.

Generally, the invention is designed to cooperate with the transmission mechanism of automotive machinery, an object of the invention being the provision of means adapted to automatically isolate the transmission gearing responsive to clutch disengagement in facilitating speed-change operations of the gearing.

A further object is the provision of devices affording a most efficient free-wheeling unit capable of additive attachment to any type of transmission exteriorly of the same, or as might be desired, built-in as a component part of the same within the transmission housing.

A further object is the provision of readily operated means adapted to selectively render the novel release devices inoperative, more particularly to utilize the retarding characteristics of the engine compression as generally desired for grade descents, or to impart reverse directional travel from the drive to the driven member.

Further objects and advantages over free-wheeling mechanism heretofore devised, more particularly with respect to precision of operation and serviceability of the component parts, will become apparent in the course of the following detailed description and claims, the invention consisting in the novel construction, adaptation, and combination of parts as hereinafter described and claimed.

In the drawings:

Figure 1 is a longitudinal vertical section taken through a preferred embodiment of the present invention, the parts thereof being shown in released dispositions responsive to an over-running of the driven member.

Fig. 2 is a transverse vertical section taken on the line 2—2 of Fig. 1, illustrating the cam slots, however, in elevation.

Figs. 3 and 4 are transverse vertical sections on the lines 3—3 and 4—4, respectively, of Fig. 1.

Fig. 5 is a transverse vertical section illustrating the jaws in full clutching engagement, said section taken on line 5—5 of Fig. 6; and Fig. 6 is a side elevation of the assembly illustrated in the foregoing views with the casing proper and the friction ring removed, the drive clutching jaws being represented as advanced into meshing engagement with the driven member.

Reference being had thereto, the numerals 10, 11 represent the drive shaft and the driven shaft, respectively, of a machine assembly, which may include a gear transmission (not shown) having suitable operative connection with the shaft 10. Sleeved over the latter and rigidly attached for integral movement therewith, as by a transverse drive-fitting pin 13, is a ring 14, said ring hereinafter termed the control member and having an end bore for the reception of a bushing 15 adapted to maintain shafts 10, 11 in axial alignment, one with the other.

Surrounding said member 14 and axially controlled thereby, the invention further provides a clutching sleeve 16 faced at its outer end by a series of circumferentially-spaced jaw-teeth 17 arranged for movement into and out of engagement with jaw teeth 20 of a driven member 21 splined for conjoint movement with shaft 11.

Reverting to the aforementioned axial movement of clutching sleeve 16, said sleeve provides a pair of angular cam slots 22 each adapted to a riding engagement therein of terminal stud projections 13¹ of the transverse pin 13 to afford, co-operatively with drive lugs 23, 23¹ and 24, 24¹, disposed externally and internally, respectively, at diametrically opposite sides of members 14, 16, an arcuate movement, one to the other, through an approximate 100° radius. 25 represents a friction ring secured about the periphery of driven member 21 to encase the clutching sleeve 16.

Referring more particularly to said foregoing mechanism, which constitutes the automatic release, normal clockwise rotation of shaft 10 and member 14 at an accelerated speed to that of shaft 11 and member 21, advances the clutching sleeve 16 responsive to movement of the studs 13¹ in the retrograde cam slots 22. Sleeve 16 is advantageously retarded through frictional characteristics of grease or the like maintained between friction ring 25 and the sleeve.

Likewise, as shaft 11 accelerates with respect to shaft 10 responsive to a decreased energy output from the power source, studs 13¹ advance in the respective cam slots to contact the lugs 23, 23¹ with respective lugs 24¹, 24, withdrawing teeth 17 out of mesh with teeth 20.

The driving lugs being inoperative, one to another, during the meshing operation of the teeth, the arrangement affords a full-floating of the clutching sleeve to prevent a possibility of stripping.

Housing the aforedescribed mechanism, I further provide a casing 30 slidably keyed to shaft 10 and having an internally-toothed ring 31 rigidly secured at its outer end for axial movement of the teeth 32 thereof into and out of mesh with jaw teeth 33 provided by said driven member 21 supplemental to the aforementioned teeth 20, said axial movement being manually controlled through suitable devices, as by a fulcrumed lever engageable in the peripheral groove 35, to selectively render the automatic release inoperative, providing a direct drive through the casing to the driven shaft.

The preferred structure and operation of the mechanism embodying the present invention is believed obvious.

It is not my intention, however, to confine the scope except as by the terms of the hereto annexed claims.

What I claim, is,—

1. In power transmission mechanism including axially aligned driving and driven shafts, control devices therefor adapted to automatically couple and uncouple said shafts, respectively, responsive to an accelerated speed of the former with respect to the latter and an over-running of the latter with respect to the former, said devices comprising members secured to said shafts, said drive secured member having diametrically oppositely disposed stud members projecting therefrom, said driven member having circumferentially spaced jaw teeth, a clutching ring providing jaw teeth oppositionally disposed to the jaw teeth of said driven member, said clutching ring having angular cam slots adapted to receive respective studs, and a friction ring carried by said driven member to encircle said clutching ring, said friction ring serving to impart relative rotary movement to said clutching ring responsive to relative variations in the speeds of said driven member and the drive member.

2. In drive mechanism for an automotive vehicle of the character including a transmission, the combination with a power output shaft from the transmission, and a torque shaft driven by said power output shaft, of means adapted for introduction between said power output and torque shafts for automatically isolating the transmission gearing from the torque shaft, said means comprising a member rigid with the torque shaft, teeth on said member arranged concentrically about said shaft axis, a second member rigid with said power-output shaft from the transmission, a floating sleeve supported about said second member, teeth therefor arranged for intermeshing engagement with the teeth of said first named member, angular cam slots in said floating sleeve, studs rigid with said second named member arranged for tracking engagement in said slots, lugs carried by said second named member and the sleeve for imparting drive activity from the second named member to the sleeve, and a ring carried by said first named member and surrounding said sleeve, said ring being adapted through the adherence of grease or the like introduced therebetween and the sleeve to frictionally impart relative movement to said sleeve in opposition to the rotation of said second named member, said relative movement axially motivating the sleeve teeth into and out of meshing engagement with the teeth of said first named member.

3. The apparatus as defined in claim 2, said driving lugs being rendered inoperative, one to the other, prior to full meshing of the teeth.

4. The apparatus as defined in claim 2, said output shaft having a casing slidably keyed on the same, teeth provided by said casing arranged to mesh teeth formed in and complementary to the sleeve-meshing teeth of said first named member, and means for axially motivating the casing teeth into meshing engagement with the complementary teeth of said first named member to render said automatic isolation devices inoperative.

5. In automotive drive mechanism, of a character including a transmission, a power output shaft from the transmission, and a torque shaft driven by said power output shaft, means adapted for introduction between said power output and torque shafts for automatically isolating the transmission gearing from the torque shaft, said means comprising teeth rigidly secured with respect to the torque shaft and arranged concentrically about the axis thereof, a sleeve supported about the power output shaft, teeth thereon arranged for meshing engagement with said first named teeth, said sleeve having angular cam slots, studs integrally supported by said output shaft arranged for tracking engagement in said slots, and a ring carried by said torque shaft and surrounding said sleeve to impart relative movement to said sleeve in opposition to the rotation of said output shaft, said movement affording relative activity of said studs and slots, one to the other, to axially motivate the sleeve teeth into and out of meshing engagement with the teeth of said torque shaft.

6. In power transmission mechanism, in combination with axially aligned driving and driven members, mechanism for automatically coupling and uncoupling said members, respectively, responsive to an accelerated speed of the former with respect to the latter and an overrunning of the latter with respect to the former, said mechanism comprising a floating sleeve supported about the drive member and providing an angular slot, lugs carried by said drive member and the sleeve for imparting drive activity to the sleeve, a stud member received in said slot and supported by the drive member, a member rigid with the driven member, and means provided on said last named member and on the sleeve for coupling the same together, said means being controlled into and out of engagement responsive to relative directional activity of the stud in the sleeve slot.

7. In means for automatically coupling a driving and a driven shaft responsive to an acceleration of the former with respect to the latter, a member sleeved over said driving shaft, drive means therebetween, a second member rigid with the driven shaft, means responsive to movement of said first named member longitudinally of the drive shaft for coupling said member with the rigid member, and means automatically affording said longitudinal movement responsive to an accelerated speed of the driving with respect to the driven shaft, said drive means between the shaft and the sleeve being rendered inoperative during said longitudinal movement of the sleeve.

8. In a power-driven vehicle, a free-wheeling unit for the torque shaft of said vehicle comprising, in combination with the torque shaft, a member having means normally coupling the same with the torque shaft, a drive shaft, means normally connecting said member with the drive shaft for driving the member, and means affording axial movement to said member with respect to the drive shaft for uncoupling said member from the torque shaft responsive to an overrunning of said torque shaft, said means for connecting the drive shaft with the member to drive the member being rendered inoperative responsive to said axial movement.

9. The combination with a pair of rotative toothed members and a shaft supporting one of said members and providing lugs for driving the same, means operatively interconnecting said shaft and the supported member for meshing the teeth of said member with the other of said toothed members, said means comprising an angular cam slot and a stud arranged for tracking engagement in said slot.

10. The combination with a rotative member, and a second member adapted for floating activity, a shaft adapted to relative movement in opposition to the rotation of said floating member, means responsive to rotary movement of said shaft relatively in opposition to said floating member for coupling said first named with the floating member, and means affording a drive connection between said shaft and the floating member responsive to a coupling of said members.

11. The combination with driving and driven shafts and a member supported by one of said shafts and adapted for movement relatively in opposition to the rotation of said supporting shaft, said movement being adapted to couple and uncouple said shafts, of a ring serving to impart said relative rotary movement to the member responsive to relative variation in the speeds of rotation of said shafts, said relative rotary movement of the ring being afforded through the frictional adherence thereto of grease or the like introduced between said ring and said member.

SERN P. WATT.